(12) United States Patent
Castinado et al.

(10) Patent No.: US 12,124,875 B2
(45) Date of Patent: Oct. 22, 2024

(54) SYSTEM AND METHOD FOR FACILITATING CREATION, VERIFICATION, AND MANAGEMENT OF DIGITAL RESOURCES

(71) Applicant: BANK OF AMERICA CORPORATION, Charlotte, NC (US)

(72) Inventors: Joseph Benjamin Castinado, North Glenn, CO (US); Brandon Ingram, Charlotte, NC (US); Naoll Addisu Merdassa, Chakopee, MN (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 374 days.

(21) Appl. No.: 17/375,617

(22) Filed: Jul. 14, 2021

(65) Prior Publication Data
US 2023/0019921 A1 Jan. 19, 2023

(51) Int. Cl.
*G06F 9/50* (2006.01)
*G06F 9/451* (2018.01)

(52) U.S. Cl.
CPC .......... *G06F 9/5005* (2013.01); *G06F 9/451* (2018.02)

(58) Field of Classification Search
CPC ......... G06F 9/5005; G06F 9/451; G06F 16/93
See application file for complete search history.

(56) References Cited

U.S. PATENT DOCUMENTS

| | | | | |
|---|---|---|---|---|
| 8,065,713 | B1* | 11/2011 | Vainstein | H04L 63/0428 |
| | | | | 713/168 |
| 2006/0179001 | A1* | 8/2006 | Kim | H04N 7/1675 |
| | | | | 348/E7.056 |
| 2007/0118525 | A1* | 5/2007 | Svendsen | H04L 67/1063 |
| | | | | 707/999.009 |
| 2008/0306871 | A1* | 12/2008 | Grannan | H04N 21/482 |
| | | | | 705/51 |
| 2014/0013305 | A1* | 1/2014 | Ravikumar | G06F 11/3688 |
| | | | | 717/124 |
| 2014/0258972 | A1* | 9/2014 | Savage | G06F 9/451 |
| | | | | 717/106 |
| 2021/0141930 | A1* | 5/2021 | Aziz | G06F 21/6245 |
| 2021/0319082 | A1* | 10/2021 | Bernardi | H04L 51/10 |
| 2021/0383004 | A1* | 12/2021 | Manasse | G06F 21/6209 |
| 2022/0351280 | A1* | 11/2022 | Cardenas Gasca | ........ |
| | | | | G06Q 20/0655 |

* cited by examiner

*Primary Examiner* — Daniel W Parcher
(74) *Attorney, Agent, or Firm* — Moore & Van Allen PLLC; Nicholas C. Russell

(57) ABSTRACT

Embodiments of the present invention provide a system for facilitating creation, verification, and management of digital resources. The system is configured for receiving a digital content for upload to a distributed register from a user, via a user interface, receiving one or more instructions associated with distribution of the digital content from the user, via the user interface, creating one or more digital resources from the digital content via the user interface based on the one or more instructions received from the user, and storing the one or more digital resources on the distributed register.

14 Claims, 5 Drawing Sheets

SYSTEM AND METHOD FOR FACILITATING CREATION, VERIFICATION, AND MANAGEMENT OF DIGITAL RESOURCES

BACKGROUND

Conventional systems do not have the ability to facilitate creation, verification, and management of digital resources. As such, there exists a need for a centralized system that facilitates a user friendly interface that allows users to create, verify, and manage digital resources.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for facilitating creation, verification, and management of digital resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives a digital content for upload to a distributed register from a user, via a user interface, receive one or more instructions associated with distribution of the digital content from the user, via the user interface, creates one or more digital resources from the digital content via the user interface based on the one or more instructions received from the user; and stores the one or more digital resources on the distributed register.

In some embodiments, the present invention the one or more instructions associated with the distribution of the digital content comprise instructions associated with duplication of the digital content, instructions associated with division of the digital content, and instructions associated with transfer of the digital content to one or more other users.

In some embodiments, the present invention creates the one or more digital resources based on creating one or more copies of the digital content based on the instructions associated with the duplication of the digital content, assigning a unique identifier for each copy of the one or more copies, and creating a digital resource associated with the each copy of the one or more copies of the digital content.

In some embodiments, the present invention creates the one or more digital resources based on splitting the digital content into one or more parts based on the instructions associated with the division of the digital content, assigning a unique identifier for each part of the one or more parts, and creating a digital resource associated with the each part of the one or more parts of the digital content.

In some embodiments, the present invention receives a request for a digital resource of the one or more digital resources from at least one other user of the one or more other users, transfers the digital resource to the at least one other user based on the instructions associated with the transfer of the digital content, and transmits an alert to the user associated with the user associated with the transfer of the digital resource to the at least one other user.

In some embodiments, the digital content comprises static digital artifacts, dynamic digital artifacts, and composite digital artifacts.

In some embodiments, the present invention provides the user interface to allow one or more users to create, verify, and manage one or more digital resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
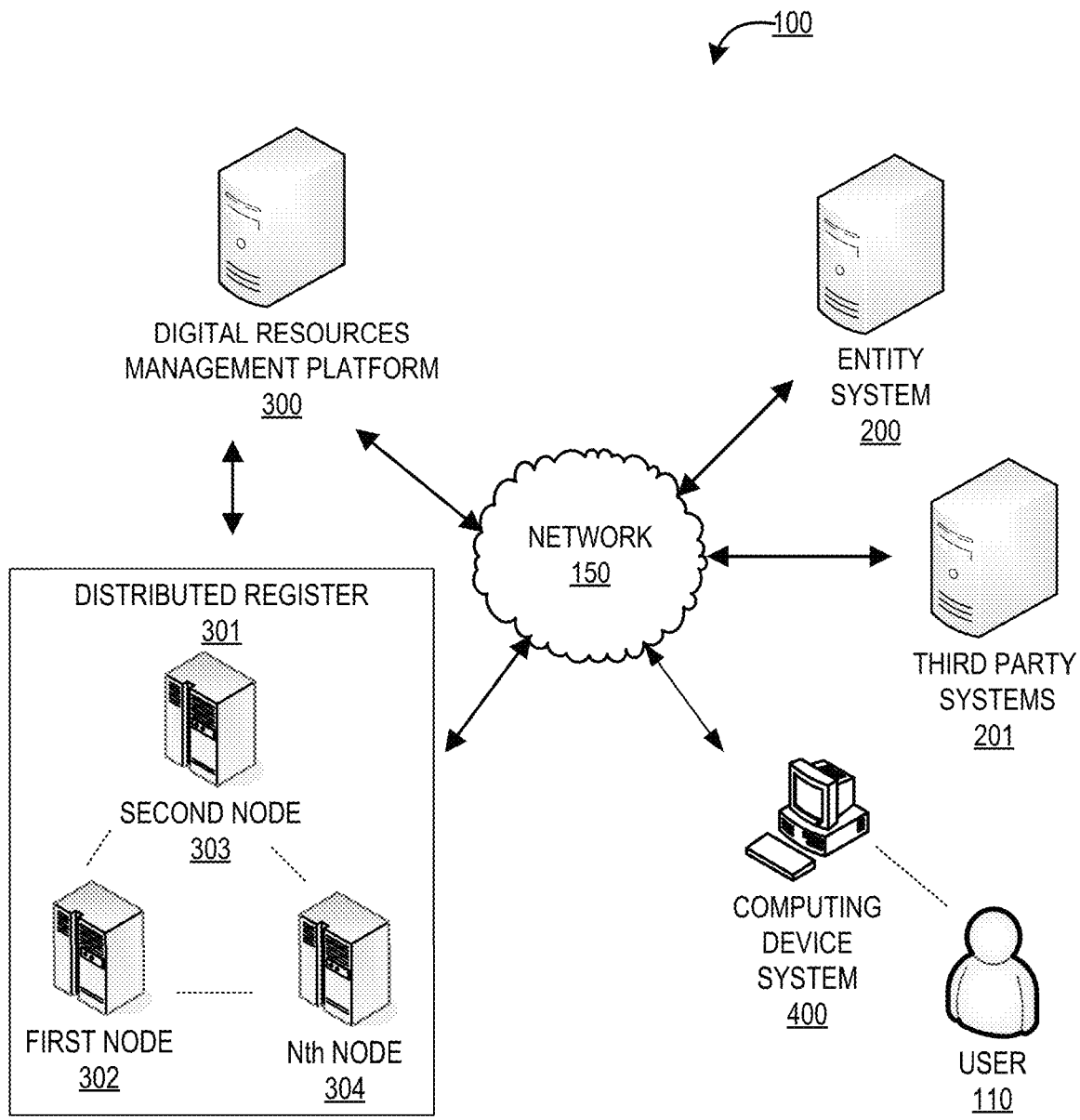
Figure 2:
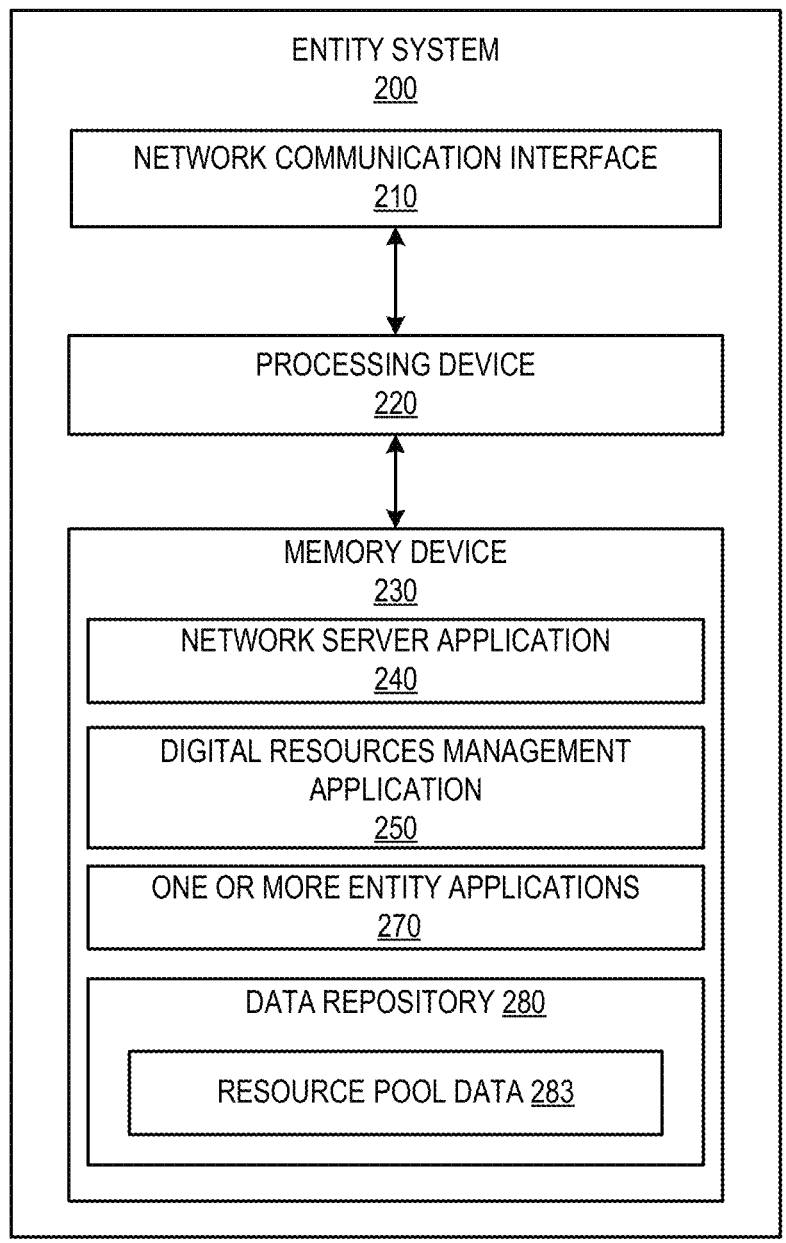
Figure 3:
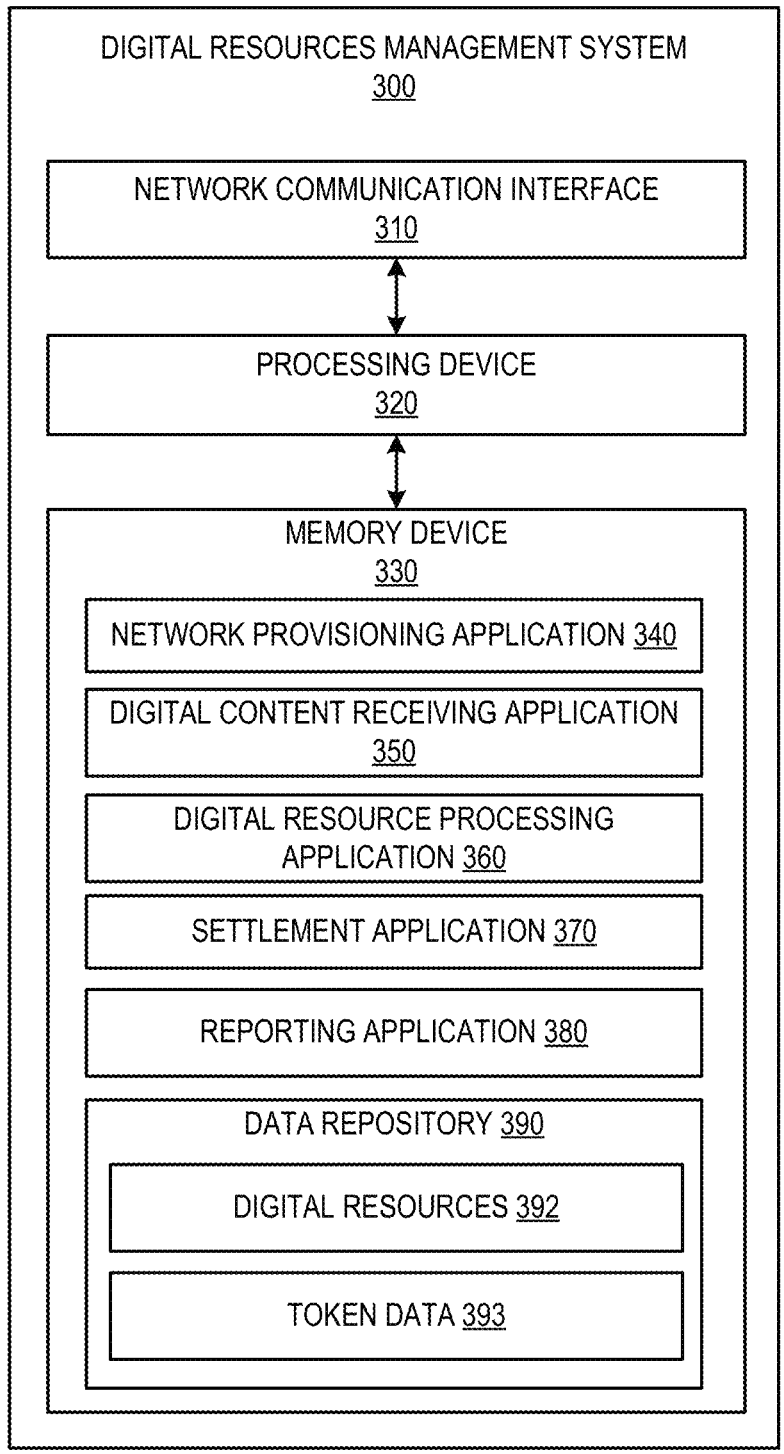
Figure 4:
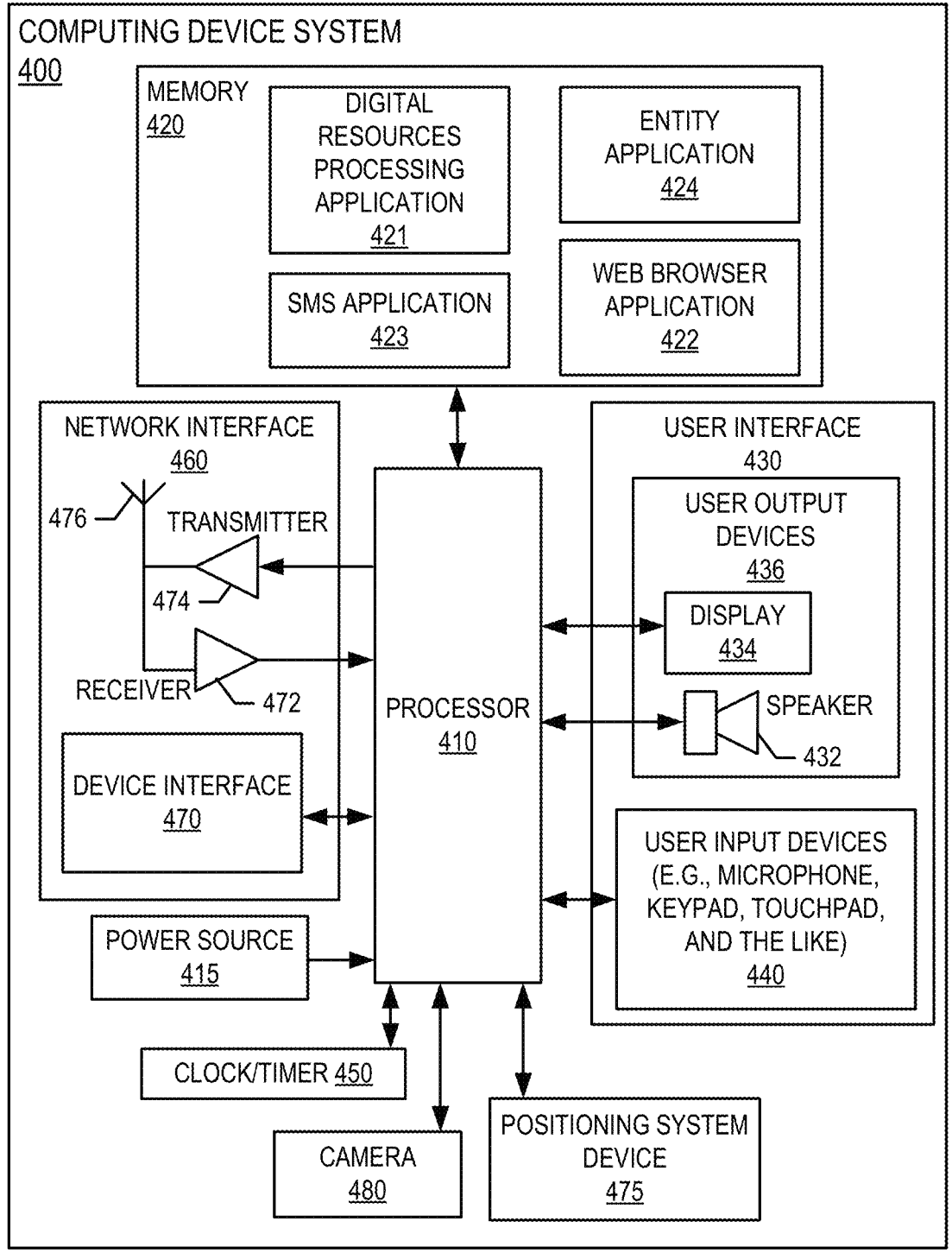
Figure 5:
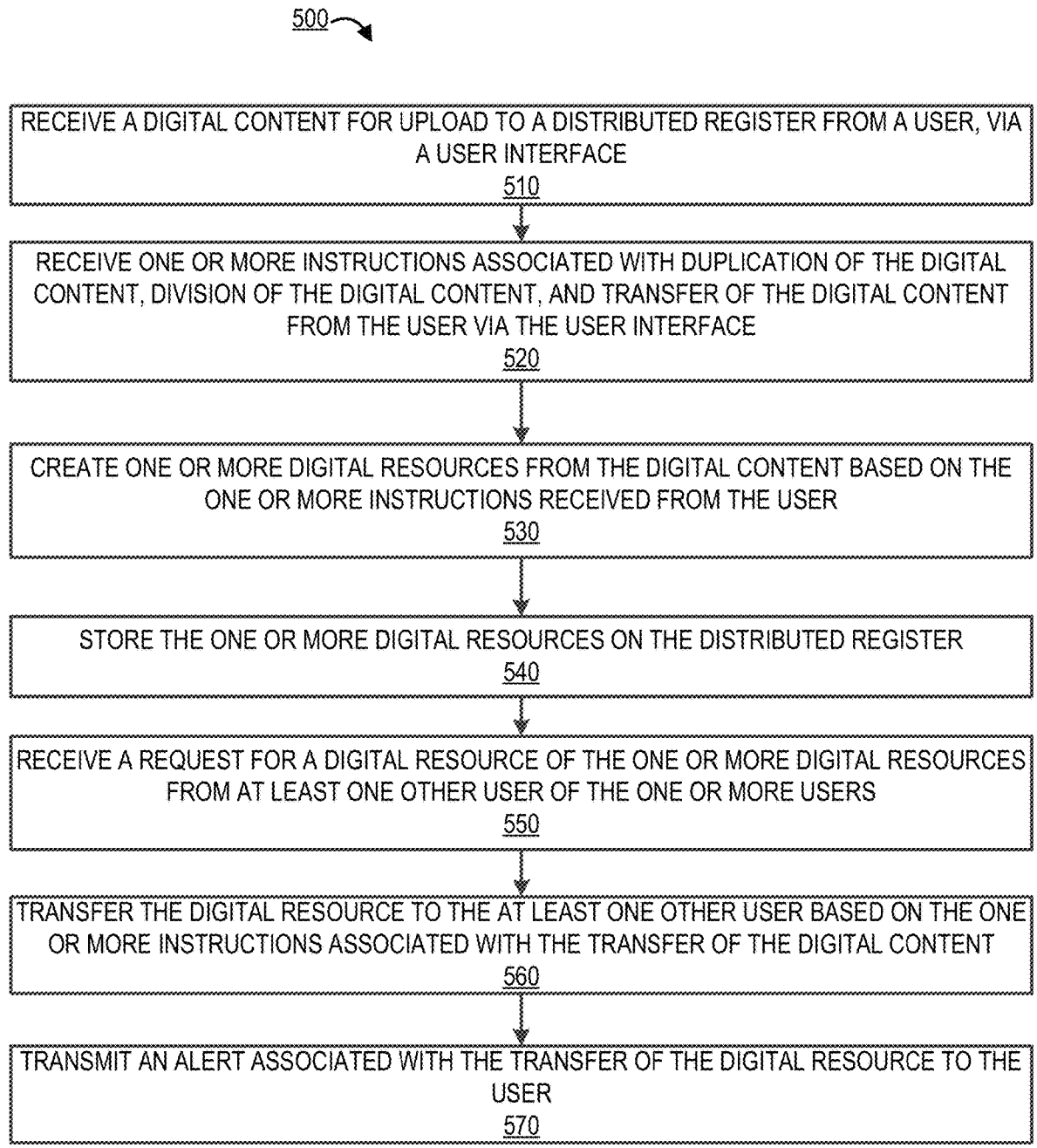

Having thus described embodiments of the invention in general terms, reference will now be made the accompanying drawings, wherein:

FIG. 1 provides a block diagram illustrating a system environment for facilitating creation, verification, and management of digital resources, in accordance with an embodiment of the invention;

FIG. 2 provides a block diagram illustrating the entity system 200 of FIG. 1, in accordance with an embodiment of the invention;

FIG. 3 provides a block diagram illustrating a digital resources management system 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for facilitating creation, verification, and management of digital resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a"

and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, insurance companies and the like. In some embodiments, the entity may be a non-financial institution. In accordance with some embodiments of the invention, the terms "third party system" and "other third party systems" may be associated third party entities that may use one or more features presented by the system of the present invention. Furthermore, embodiments of the present invention use the term "user" or "customer." It will be appreciated by someone with ordinary skill in the art that the user or customer may be a customer of the financial institution or a potential customer of the financial institution or an employee of the financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

"Distributed register," as used herein may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. In some embodiments of the present invention, a user may submit data associated with the creation of a new block associated with the linked block structure. For example, a user may initiate a transaction, where the data associated with the transaction is stored in a new block linked with the transaction.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm. In some embodiments of the present invention, the distributed ledger being described herein may be a permissioned distributed ledger. In some embodiments of the present invention, the distributed ledger being described herein may be a private distributed ledger.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

In accordance with embodiments of the invention, "digital resources" may be Non-Fungible Tokens (NFTs), where NFT is a unit of data used a unique digital identifier stored on a distributed register that certifies ownership and authenticity of a digital artifact. As such, NFTs are stored in a distributed ledger—a database that is consensually shared and synchronized across multiple sites, institutions, or geographies, accessible by multiple people. Distributed ledgers use independent computers (referred to as nodes) to record, share and synchronize transactions in their respective electronic ledgers (instead of keeping data centralized as in a traditional ledger). In accordance with embodiments of the present invention, NFTs are created when a distributed ledger (e.g., blockchain) string records of cryptographic hash, a set of characters that verifies a set of data to be unique, onto previous records therefore creating a chain of identifiable data artifacts. This cryptographic transaction process ensures the authentication of each digital file by providing a digital signature that is used to track NFT ownership.

FIG. 1 provides a block diagram illustrating a system environment 100 for facilitating creation, verification, and management of digital resources, in accordance with an embodiment of the invention. As illustrated in FIG. 1, the environment 100 includes a digital resources management system 300, an entity system 200, a distributed register 301, a computing device system 400, and third party systems 201. One or more users 110 may be included in the system environment 100, where the users 110 interact with the other entities of the system environment 100 via a user interface of the computing device system 400. In some embodiments, the one or more user(s) 110 of the system environment 100 may be customers and/or potential customers of an entity associated with the entity system 200.

The entity system(s) 200 may be any system owned or otherwise controlled by an entity to support or perform one or more process steps described herein. In some embodiments, the managing entity is a financial institution. In some embodiments, the entity system 200 may include one or more servers. Third party systems 201 may be any systems that provide one or more digital artifacts to the entity, where the one or more digital artifacts may be any content that is stored digitally. In some embodiments, the third party systems 201 may be any systems associated with third parties that have partnered with the entity.

The digital resources management system 300 is a system of the present invention for performing one or more process steps described herein. In some embodiments, the digital resources management system 300 may be an independent system. In some embodiments, the digital resources management system 300 may be a part of the entity system 200.

In some embodiments, the distributed register 301 comprises one or more nodes (e.g., first node 302, second node 303, through nth node). In some embodiments, the distributed register 301 may be a private distributed register associated with the entity. In some embodiments, the distributed register 301 may be a public distributed register. In some embodiments, one or more of the digital resources management system 300, the entity system 200, the third party systems 201, and the computing device system 400 may be one or more nodes of the distributed register 301.

The digital resources management system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the digital resources management system 300 is configured to communicate information or instructions with the entity system 200, the computing device system 400, and/or the third party systems 201 across the network 150.

The computing device system 400 may be a system owned or controlled by the entity of the entity system 200, the user 110, and/or a third party. As such, the computing device system 400 may be a computing device of the user 110. In general, the computing device system 400 communicates with the user 110 via a user interface of the computing device system 400, and in turn is configured to communicate information or instructions with the digital resources management system 300, entity system 200, and/or the third party systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a digital resources management application 250, one or more entity applications 270, and a data repository 280 comprising interaction data 283. The computer-executable program code of the network server application 240, the digital resources management application 250, the one or more entity applications 270, to perform certain logic, data-extraction, and data-storing functions of the entity system 200 described herein, as well as communication functions of the entity system 200.

The network server application 240, the digital resources management application 250, the one or more entity applications 270, are configured to store data in the data repository 280 or to use the data stored in the data repository 280 when communicating through the network communication interface 210 with the digital resources management system 300, the computing device system 400, and/or the third party systems 201 to perform one or more process steps described herein. In some embodiments, the entity system 200 may receive instructions from the digital resources management system 300 via the digital resources management application 250 to perform certain operations. The digital resources management application 250 may be provided by the digital resources management system 300. The one or more entity applications 270 may be any of the applications used, created, modified, and/or managed by the entity system 200. In one embodiment, an entity application may be an online banking application provided to the one or more users 110. In some embodiments, an entity application may comprise a digital wallet that is configured for storing digital resources and displaying value (e.g., monetary value) associated with the digital resources.

FIG. 3 provides a block diagram illustrating the digital resources management system 300 in greater detail, in accordance with embodiments of the invention. As illustrated in FIG. 3, in one embodiment of the invention, the digital resources management system 300 includes one or more processing devices 320 operatively coupled to a network communication interface 310 and a memory device 330. In certain embodiments, the digital resources management system 300 is operated by a first entity, such as a financial institution. In some embodiments, the digital resources management system 300 is owned or operated by the entity of the entity system 200. In some embodiments, the digital resources management system 300 may be an independent system. In alternate embodiments, the digital resources management system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the digital resources management system 300 described herein. For example, in one embodiment of the digital resources management system 300, the memory device 330 includes, but is not limited to, a network provisioning application 340, a digital content receiving application 350, a digital content processing application 360, a settlement application 370, a reporting application 380, and a data repository 390 comprising digital resources information 392, token data 393 (e.g., unique identifier data), and any data processed or accessed by one or more applications in the memory device 330. The computer-executable program code of the network provisioning application 340, the digital content receiving application 350, the digital content processing application 360, the settlement application 370, and the reporting application 380 may instruct the processing device 320 to perform certain logic, data-processing, and data-storing functions of the digital resources management system 300 described herein, as well as communication functions of the digital resources management system 300.

The network provisioning application 340, the digital content receiving application 350, the digital content processing application 360, the settlement application 370, and the reporting application 380 are configured to invoke or use the data in the data repository 390 when communicating through the network communication interface 310 with the entity system 200, the computing device system 400, and/or the third party systems 201. In some embodiments, the network provisioning application 340, the digital content receiving application 350, the digital content processing application 360, the settlement application 370, and the reporting application 380 may store the data extracted or received from the entity system 200, the third party system 201, and the computing device system 400 in the data repository 390. In some embodiments, the network provisioning application 340, the digital content receiving application 350, the digital content processing application 360, the settlement application 370, and the reporting application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a digital resources management application 421, entity application 424. These applications also typically instructions to a graphical user interface (GUI) on the display 430 that allows the user 110 to interact with the entity system 200, the digital resources management system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the digital resources management application 421 provided by the digital resources management system 300 allows the user 110 to access the digital resources management system 300. In some embodiments, the entity application 424 provided by the entity system 200. In some embodiments, the entity application 424 may be an online banking application. In some embodiments, the digital resources management application 421 allow the user 110 to access the functionalities provided by the digital resources management system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for facilitating creation, verification, and management of digital resources, in accordance with an embodiment of the invention.

As shown in block 510, the system receives a digital content for upload to a distributed register from a user, via a user interface. The digital content may refer to any content that can be stored digitally. The digital content may comprise static digital artifacts, dynamic digital artifacts, and composite digital artifacts. The static digital artifacts may include, but are not limited to, photos, images, files containing text, spreadsheets, or the like. The dynamic digital artifacts may include, but are not limited to, videos, music, Graphic Interchange Formats, or the like. The composite digital artifact may be digital content that is constructed by combination portions of various digital artifacts in some form or another. For example, a movie may be considered a collaborative digital artifact if that movie is made using an existing video, layered with existing music in the background, represented by existing digital art. The user interface provided by the system allows the user to create, manage, and verify one or more digital resources that are created from the digital content provided by the user. In some embodiments, the intuitive user interface allows the user to easily create digital resources from digital content without having any technical knowledge associated with how digital resources are created and stored on a distributed register. For example, there may be a single click functionality on the graphical user interface for each of the steps explained in the process flow 500. The user interface provides one or more single click functionalities that allow one or more users to create, verify, and manage one or more digital resources. The system may also onboard one or more users using the system of the present invention with the help of the user interface. In some embodiments, the one or more users may be customers of the entity. In some other embodiments, the one or more users may be potential customers of the entity. In some embodiments, the one or more users may not be customers of the entity.

As shown in block 520, the system receives one or more instructions associated with duplication of the digital content, division of the digital content, and transfer of the digital content from the user via the user interface. The instructions associated with the duplication of the digital content may comprise instructions associated with how many copies of the digital content are to be created. For example, the user may specify that the digital content may be replicated five times such that five copies are available, where each of the copy may be assigned a unique identifier. The unique identifier may distinguish the five copies, where a first copy may be assigned a higher numerical unique identifier when compared with the fifth copy which may define the monetary value associated with the first copy (e.g., monetary value of the first copy may be higher than the monetary value of the second copy). Similarly, the instructions associated with the division of the digital content may comprise instructions associated with how many parts the digital content can be divided into, where each part may be assigned a unique identifier. For example, the user may specify that music content uploaded by the user may be divided into four parts, where the first part may be assigned a higher numerical identifier when compared with the fourth part. The one or more instructions associated with transfer of the digital content may comprise instructions associated with licenses, permits, sale, or the like of the digital content. In one example, the user may specify that other users may access and/or use the digital content by purchasing a license for X amount. In another example, the user may specify that other users may purchase all rights associated with the digital content for Y amount. In some embodiments, the value of the digital content may vary based on the demand and type of the digital content and the system may automatically adjust the value of the digital content.

As shown in block 530, the system creates one or more digital resources from the digital content based on the one or more instructions received from the user. As shown in block 540, the system stores the one or more digital resources on the distributed register. In some embodiments, the one or more digital resources are created after storing the digital content on the distributed register. In an exemplary embodiment, if the user provides instructions associated with the duplication of the digital content, the system may create 'n' number of copies of the digital content specified by the user. In a case where the number 'n' is greater than 1, the system may automatically assign a unique identifier for each of the 'n' number of copies and may store each of the 'n' number of copies on the distributed register to create a digital resource associated with each of the 'n' number of copies. In another exemplary embodiment, if the user provides instructions associated with the division of the digital content, the system may divide the digital content into 'm' number of parts as specified by the user and may automatically assign a unique identifier for each of the 'm' number of parts and may store each of the 'm' number of parts on the distributed register to create a digital resource associated with each of the 'm' number of parts. In some embodiments, the system may bill the user a fixed payment associated with the creation of the one or more digital resources from the digital content, where the fixed payment may be in the form of digital currency or normal currency.

As shown in block 550, the system receives a request for a digital resource of the one or more digital resources from at least one other user of the one or more users. Another user may notify the system about purchasing/licensing a digital resource of the one or more one or more digital resources via the graphical user interface provided by the system. In such embodiments, the system may allow the other user to verify the authenticity of the digital resource via a single click functionality. Once the other user clicks the single click functionality the system verifies that the digital resource the user is trying to purchase/license is legit or not by communicating with other third party systems and verifying that no other unauthorized/duplicate copies of the digital resource exist.

As shown in block 560, the system transfers the digital resource to the at least one other user based on the one or more instructions associated with the transfer of the digital content. Upon successful verification, the other user may submit a payment corresponding to the value of the digital resource at the time. After the transaction is successful, the system may transfer the digital resource to the at least one other user and may also transmit an alert associated with the transfer of the digital resource to the user as shown in block 570. In some embodiments, the system also provides a digital wallet for storing the digital resources and for managing the digital resources. The digital wallet may be different from the regular digital wallets used for storing credit card information. In some embodiments, the digital wallet may also display real-time values of the digital resources. In some embodiments, the system may allow the user to connect the digital wallet with an entity application (e.g., online banking application), where any amount associated with transactions (e.g., sale of digital resources, purchase of license or subscription to use the digital resources) may be transferred to the digital wallet and/or the entity application of the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for facilitating creation, verification, and management of non-fungible tokens, the system comprising:
   at least one network communication interface;
   at least one non-transitory storage device; and
   at least one processing device coupled to the at least one non-transitory storage device and the at least one network communication interface, wherein the at least one processing device is configured to:
   receive a digital content for upload to a distributed register from a user, via a user interface;
   receive one or more instructions associated with distribution of the digital content from the user, via the user interface, wherein the one or more instructions comprise instructions associated with division of the digital content;
   create one or more non-fungible tokens from the digital content via the user interface based on the one or more instructions received from the user, wherein creation of the one or more non-fungible tokens comprises:
   splitting the digital content into two or more parts based on the instructions associated with the division of the digital content;
   assigning a unique part identifier for each part of the two or more parts, wherein a monetary value associated with the each part is based at least in part on one of the assigned unique part identifier and a number of parts associated with the splitting of the digital content;
   creating a non-fungible token associated with the each part of the one or more parts of the digital content;
   creating two or more copies of the digital content based on the instructions associated with the digital content;
   assigning a unique copy identifier for each copy of the two or more copies; and
   creating a non-fungible token associated with the each copy of the two or more copies of the digital content;
   store the one or more non-fungible tokens on the distributed register; and
   display the one or more non-fungible tokens on a non-fungible token digital wallet, wherein the non-fungible token digital wallet comprises real-time value of the one or more non-fungible tokens, wherein the real-time value is based at least on the monetary value associated with the each part.

2. The system of claim 1, wherein the one or more instructions associated with the distribution of the digital content further comprise:
   instructions associated with duplication of the digital content; and
   instructions associated with transfer of the digital content to one or more other users.

3. The system of claim 2, wherein the at least one processing device is configured to:
   receive a request for a first non-fungible token of the one or more non-fungible tokens from at least one other user of the one or more other users;
   transfer the first non-fungible token to the at least one other user based on the instructions associated with the transfer of the digital content; and
   transmit an alert to the user associated with the transfer of the first non-fungible token to the at least one other user.

4. The system of claim 1, wherein the digital content comprises static digital artifacts, dynamic digital artifacts, and composite digital artifacts.

5. The system of claim 1, wherein the user interface provides one or more single click functionalities that allow one or more users to create, verify, and manage one or more non-fungible tokens.

6. A computer program product for facilitating creation, verification, and management of non-fungible tokens, the computer program product comprising a non-transitory computer-readable storage medium having computer executable instructions for causing a computer processor to perform the steps of:
   receiving a digital content for upload to a distributed register from a user, via a user interface;
   receiving one or more instructions associated with distribution of the digital content from the user, via the user interface, wherein the one or more instructions comprise instructions associated with division of the digital content;
   creating one or more non-fungible tokens from the digital content via the user interface based on the one or more instructions received from the user, wherein creation of the one or more non-fungible tokens comprises:
      splitting the digital content into two or more parts based on the instructions associated with the division of the digital content;
      assigning a unique part identifier for each part of the two or more parts, wherein a monetary value associated with the each part is based at least in part on one of the assigned unique part identifier and a number of parts associated with the splitting of the digital content;
      creating a non-fungible token associated with the each part of the one or more parts of the digital content;
      creating two or more copies of the digital content based on the instructions associated with the digital content;
      assigning a unique copy identifier for each copy of the two or more copies;
      creating a non-fungible token associated with the each copy of the two or more copies of the digital content; and
   storing the one or more non-fungible tokens on the distributed register; and
   displaying the one or more non-fungible tokens on a non-fungible token digital wallet, wherein the non-fungible token digital wallet comprises real-time value of the one or more non-fungible tokens, wherein the real-time value is based at least on the monetary value associated with the each part.

7. The computer program product of claim 6, wherein the one or more instructions associated with the distribution of the digital content further comprise:
   instructions associated with duplication of the digital content; and
   instructions associated with transfer of the digital content to one or more other users.

8. The computer program product of claim 7, wherein the computer executable instructions for causing a computer processor to perform the steps of:
   receiving a request for a first non-fungible token of the one or more non-fungible tokens from at least one other user of the one or more other users;
   transferring the first non-fungible token to the at least one other user based on the instructions associated with the transfer of the digital content; and
   transmitting an alert to the user associated with the transfer of the first non-fungible token to the at least one other user.

9. The computer program product of claim 6, wherein the digital content comprises static digital artifacts, dynamic digital artifacts, and composite digital artifacts.

10. A computer implemented method for facilitating creation, verification, and management of non-fungible tokens, the method comprising:
   receiving a digital content for upload to a distributed register from a user, via a user interface;
   receiving one or more instructions associated with distribution of the digital content from the user, via the user interface;
   creating one or more non-fungible tokens from the digital content via the user interface based on the one or more instructions received from the user, wherein creation of the one or more non-fungible tokens comprises:
      splitting the digital content into two or more parts based on the instructions associated with the division of the digital content;
      assigning a unique part identifier for each part of the two or more parts, wherein a monetary value associated with the each part is based at least in part on one of the assigned unique part identifier and a number of parts associated with the splitting of the digital content;
      creating a non-fungible token associated with the each part of the one or more parts of the digital content;
      creating two or more copies of the digital content based on the instructions associated with the digital content;
      assigning a unique copy identifier for each copy of the two or more copies;
      creating a non-fungible token associated with the each copy of the two or more copies of the digital content;
   storing the one or more non-fungible tokens on the distributed register; and
   displaying the one or more non-fungible tokens on a non-fungible token digital wallet, wherein the non-fungible token digital wallet comprises real-time value of the one or more non-fungible tokens, wherein the real-time value is based at least on the monetary value associated with the each part.

11. The computer implemented method of claim 10, wherein the one or more instructions associated with the distribution of the digital content further comprise:
- instructions associated with duplication of the digital content; and
- instructions associated with transfer of the digital content to one or more other users.

12. The computer implemented method of claim 11, wherein the method further comprises:
- receiving a request for a first non-fungible token of the one or more non-fungible tokens from at least one other user of the one or more other users;
- transferring the first non-fungible token to the at least one other user based on the instructions associated with the transfer of the digital content; and
- transmitting an alert to the user associated with the transfer of the first non-fungible token to the at least one other user.

13. The computer implemented method of claim 10, wherein the digital content comprises static digital artifacts, dynamic digital artifacts, and composite digital artifacts.

14. The computer implemented method of claim 10, wherein the user interface provides one or more single click functionalities that allow one or more users to create, verify, and manage one or more non-fungible tokens.

* * * * *